(12) United States Patent
Lin et al.

(10) Patent No.: US 8,244,403 B2
(45) Date of Patent: Aug. 14, 2012

(54) VISUAL NAVIGATION SYSTEM AND METHOD BASED ON STRUCTURED LIGHT

(75) Inventors: Yen-Chun Lin, Taipei (TW); Yao-Jiunn Chen, Taipei (TW); Chao-Chi Wu, Kaohsiung (TW)

(73) Assignee: Industrial Technology Research Institute, Hsinchu (TW)

( * ) Notice: Subject to any disclaimer, the term of this patent is extended or adjusted under 35 U.S.C. 154(b) by 1217 days.

(21) Appl. No.: 12/031,716

(22) Filed: Feb. 15, 2008

(65) Prior Publication Data
US 2009/0118890 A1    May 7, 2009

(30) Foreign Application Priority Data
Nov. 5, 2007 (TW) .............................. 96141656 A

(51) Int. Cl.
*G05D 5/00* (2006.01)
*B23K 9/127* (2006.01)

(52) U.S. Cl. .......... 700/253; 701/23; 701/301; 180/168; 318/568.12

(58) Field of Classification Search ...................... 701/23
See application file for complete search history.

(56) References Cited

U.S. PATENT DOCUMENTS

| 4,453,085 | A | * | 6/1984 | Pryor | ............................. 700/259 |
| 4,751,658 | A | * | 6/1988 | Kadonoff et al. | ............. 701/301 |
| 4,907,169 | A | * | 3/1990 | Lovoi | ............................. 700/259 |
| 5,596,255 | A | * | 1/1997 | Miyazawa | ............... 318/568.12 |
| 6,101,431 | A |   | 8/2000 | Niwa et al. | |
| 7,079,924 | B2 | * | 7/2006 | Galbraith | ....................... 700/245 |
| 2005/0021195 | A1 | * | 1/2005 | Zeitler et al. | ..................... 701/23 |
| 2006/0074532 | A1 | * | 4/2006 | Hong | ............................... 701/28 |
| 2006/0195226 | A1 | * | 8/2006 | Matsukawa et al. | ........... 700/245 |

FOREIGN PATENT DOCUMENTS

| CN | 1569558 A | 1/2005 |
| CN | 1925988 | 3/2007 |
| CN | 101033971 | 9/2007 |
| TW | I253998 | 5/2006 |

OTHER PUBLICATIONS

"Office Action of Taiwan Counterpart Application", issued on Aug. 5, 2011, p. 1-p. 5.

* cited by examiner

*Primary Examiner* — Thomas G. Black
*Assistant Examiner* — Lin B Olsen
(74) *Attorney, Agent, or Firm* — Jianq Chyun IP Office

(57) ABSTRACT

A visual navigation system and method based on structured light are provided. The visual navigation system at least includes at least one projector for generating a specific path pattern formed by structured light, and a visual server. In addition to facilitating the visual navigation system to detect an obstacle, the pattern formed by the structured light provides a specific path pattern followed by robots during the navigation. In the visual navigation method, when detecting the obstacle, the visual server routes a virtual path and issues a movement-control command to the robots, which in turn follow the virtual path. The present invention is capable of raising the accuracy for the robot navigation and reducing operation burden of the visual server by using the structured light to guide the robots.

25 Claims, 4 Drawing Sheets

VISUAL NAVIGATION SYSTEM AND METHOD BASED ON STRUCTURED LIGHT

CROSS-REFERENCE TO RELATED APPLICATION

This application claims the priority benefit of Taiwan application serial no. 96141656, filed on Nov. 5, 2007. The entirety of the above-mentioned patent application is hereby incorporated by reference herein and made a part of this specification.

BACKGROUND OF THE INVENTION

1. Field of the Invention

The present invention relates to a visual navigation system and a method thereof. More particularly, the present invention relates to a visual navigation system and method capable of guiding robots by use of structured light.

2. Description of Related Art

Recently, with the rapid progress of sensors and control theories, an intelligent robot system originally employed in an automatic factory field has been gradually applied to various service applications, which opens up a new field of robot autonomous services. The research and development of service robots are mainly carried out by academic institutions in the past, but now they are paid more and more attention by the industry. The main reasons for the creation of in-door service robots include: 1. people want to get rid of some annoyed and boring repetitive work, such as housework and cares for the sick; 2. the cost of various electro-mechanical apparatus drops. Currently, many industrial analyses point out that, it is a prosperous technical field to utilize robots to release people from housework, which will bring great business opportunities.

In the robot system, autonomous navigation is a core technique, including wide-area positioning, obstacle detection, and path routing and tracking. At present, the biggest bottleneck for the navigation technique is that, during the navigation, the robots usually cannot anticipate or identify a dynamically changing environment. Furthermore, since the data obtained by sensors is usually incomplete, discontinuous, and unreliable, the environment-sensing capability of the robots is diversified but not robust. The robot's autonomous navigation is mainly divided into two categories; one is a visual navigation system and the other is a non-visual navigation system. The former employs a visual sensor to capture data in a unit of "surface", which has a wide sensing range and can obtain most of the environment information. Whereas, the latter obtains sensing signals in a unit of "point" or "line", in which the characteristics of different sensors may influence the navigation effect. For example, an ultrasonic sensor has a large sensing angle, a low resolution, but cannot obtain the specific shape of an obstacle; and, an infrared sensor is easily interfered by the surface characteristics of the obstacle. Currently, multi-sensing modes are combined to eliminate disadvantages of a single sensor, but the complexity of the system is accordingly increased and the power consumption is increased as well.

As for the current visual navigation methods, for example, PRC Patent No. CN1569558A discloses a robot visual navigation method using picture characteristics, which makes a full play of the advantages of image sensing, and obtains most of the environment information. In terms of the navigation function, the above method is capable of achieving a more desirable navigation effect in a non-structural space, compared with other sensors such as laser, infrared, or ultrasonic sensors. However, the aforementioned patent employs plenty of operation resources to capture feature objects in the environment such as doors, pillars, corners, or other man-made signs, then compares the identified scene image neighbouring the signs with an original map image to identify the position of the robot, and finally determines a moving direction and speed of the robot. In the applications of in-door robots, for example, clean-service robots, the aforementioned navigation method may reduce the overall navigation efficiency due to the image processing, which is also unsatisfied in evading obstacles.

As for the current non-visual navigation methods, for example, PRC Patent No. 1925988 discloses a robot navigation system and a floor material for providing absolute coordinates used by the robot navigation system. The navigation system has two-dimensional (2D) barcodes, a barcode reader, and a control unit. The 2D barcodes are formed at predetermined intervals on a floor with a predetermined size, and have different unique coordinates, respectively. The barcode reader is installed in a robot for reading the coordinates represented by the 2D barcodes on the floor, and then, the control unit performs subsequent a movement control according to the coordinates. However, the floor material adopted by the patent should be particularly manufactured, which has a high cost and easily damaged to cause the failure of the navigation. Moreover, the floor material may even be seriously damaged to cause the robot to sink therein and result in malfunctions.

Although the robot navigation methods provided by the above two patents can solve a part of the navigation problems, as for in-door service robots, the following problems still exist.

1. The robot cannot work in darkness, so the problem that an ordinary visual servo easily fails in an environment of low illumination should be overcome.

2. The operations for determining the position of an obstacle and routing a path are rather time-consuming, and an over-high operation ratio of the visual servo may seriously influence the instantaneity of the servo control.

3. All the paths are formed through using a visual servo, and the tracking of the robots is of an excessively low precision at far away positions in the image.

4. The wandering paths for autonomously moving robots are repeated, which wastes time and power.

5. An additional visual servo system usually needs to be constructed in the environment, which may affect the original layout and raise the cost of the system.

Therefore, a visual navigation system and method capable of solving the above five problems in visual navigation are needed to achieve rapid progress in the development of in-door service robots, so as to provide more reliable services for the people.

SUMMARY OF THE INVENTION

A visual navigation system and method based on structured light are provided. The visual navigation system at least includes at least one projector for generating a specific path pattern formed by structured light, and a visual server. In addition to facilitating the visual navigation system to detect an obstacle, the pattern formed by the structured light provides a specific path pattern followed by robots during the navigation. In the visual navigation method, when detecting the obstacle, the visual server routes a virtual path and issues a movement-control command to the robots, which in turn follow the virtual path. The present invention is capable of raising the accuracy for the robot navigation and reducing operation burden of the visual server by using the structured light to guide the robots.

A visual navigation system based on structured light is further provided. The system includes an image capture device, a projector, a visual server, and a robot. The projector is constructed in the environment, for projecting a specific path pattern into a space where the robot requires a navigation path. The image capture device is constructed in the environment, for capturing an image in the space and transmitting the image to the visual server to be processed. The visual server identifies a position of the robot in the image, confirms the position of an obstacle from a distorted portion of the specific path pattern projected into the space, and then once again routes a path neighbouring the obstacle to serve as a virtual path. Upon receiving a signal sent by the visual server, the robot starts moving along the specific path pattern and carries out tasks at the same time. Meanwhile, the image capture device still keeps capturing images. When the robot moves along the specific path pattern to reach a place neighbouring the obstacle, the visual server issues a navigation instruction to the robot, such that the robot adjusts its moving direction and speed accordingly and follows the virtual path routed through the previous operations. After the virtual path ends, the robot continues to move along the specific path pattern projected into the space.

A visual navigation method based on structured light is also provided. The method includes the following steps. First, a specific path pattern formed by structured light is generated in a navigation space through the projection of a projector. Next, an image in the navigation space is captured by an image capture device. Then, an obstacle is detected, in which if no obstacle exists, a robot moves along the specific path pattern; if an obstacle exists, a portion of the specific path pattern in the image distorted due to the presence of the obstacle is eliminated and a virtual boundary neighbouring the obstacle is set, so as to further route a virtual path. Then, it is determined whether a target point is reached, if yes, the navigation is finished; if not, it is determined whether the previously routed virtual path is met. In addition, if the virtual path is met, the robot follows the virtual path; if not, the robot continues moving along the specific path pattern, and the above steps of determining "whether a target point is reached" and "whether the previously routed virtual path is met" are performed repeatedly till the robot reaches the target point.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
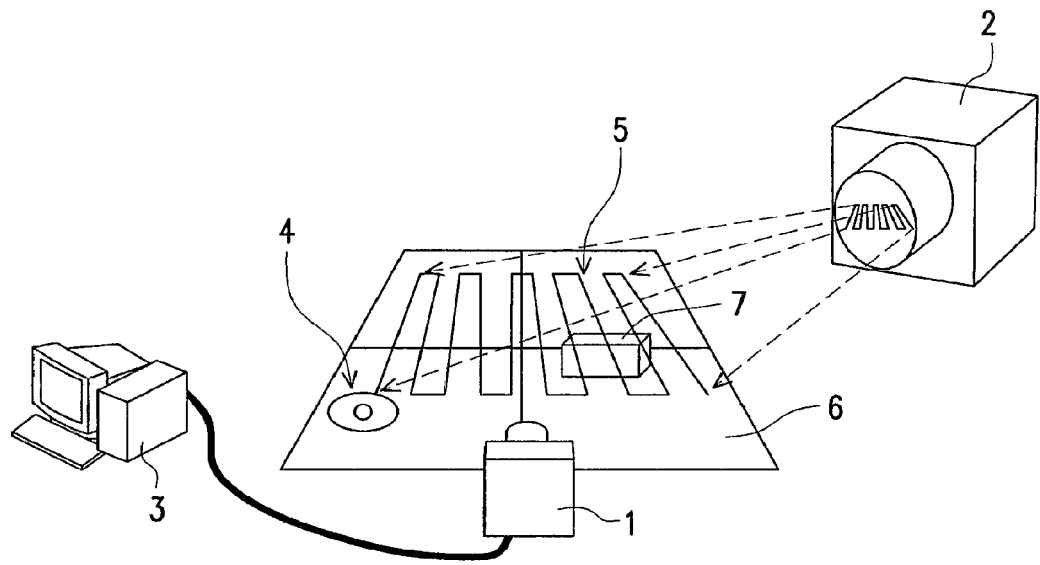
FIG. 1 shows a visual navigation system based on structured light according to a first embodiment of the present invention.

Reference will now be made in detail to the present preferred embodiments of the invention, examples of which are illustrated in the accompanying drawings. Wherever possible, the same reference numbers are used in the drawings and the description to refer to the same or like parts.

Figure 2:
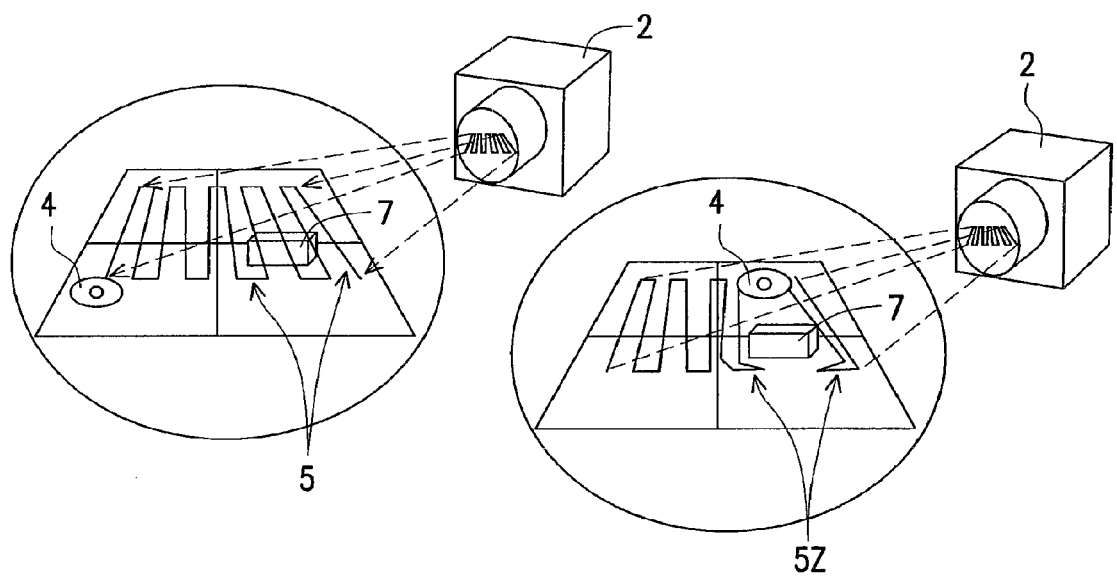
FIG. 2 shows visual fields captured by an image capture device before and after an obstacle is handled by a visual server.

First of all, a "robot" here is defined as a mobile platform capable of carrying out a particular task. Such a platform, no matter driven by wheels (or referred to as a wheeled vehicle) or moving on foot, is called a robot. Then, referring to FIG. 1, a first embodiment of the present invention is shown, and the visual navigation system based on structured light includes an image capture device 1, such as a digital camera, a projector 2, a visual server 3, and a robot 4. The projector 2 projects the structured light for forming a specific path pattern 5 into a navigation space 6 where the robot 4 requires a navigation path, and the structured light may be a visible light or invisible light. Meanwhile, the structured light may be generated continuously, or intermittently, or only once. The robot 4 senses the specific path pattern through an optical sensor or an image sensor, and thus the robot 4 is capable of moving along the specific path pattern 5. The image capture device 1 captures an image in the navigation space and then transmits the image to the visual server 3 to be processed. The visual server may be a computer or any other embedded operating device. FIG. 2 shows a visual field (on the left) captured by an image capture device before an obstacle is handled by a visual server and a visual field (on the right) captured after the obstacle is handled by the visual server. The visual server 3 identifies the position of the robot 4 in the image, confirms the position of the obstacle 7 from the distorted portion of the specific path pattern 5 projected into the navigation space 6, and then once again routes a path neighbouring the obstacle 7 to serve as a virtual path $5z$ (as shown in FIG. 2). Upon receiving a signal sent by the visual server 3, the robot 4 starts moving along the specific path pattern 5 and carries out tasks (such as cleaning) at the same time. Meanwhile, the image capture device 1 still keeps capturing images. As seen from FIG. 2, when the robot 4 moves along the specific path pattern 5 to reach a place neighbouring the obstacle 7, the visual server 3 issues a navigation instruction to the robot 4, such that the robot 4 adjusts its moving direction and speed accordingly and follows the virtual path $5z$ routed through the previous operations. After the robot's moving along virtual path $5z$ is finished, the robot 4 continues moving along the specific path pattern 5.

Figure 3:
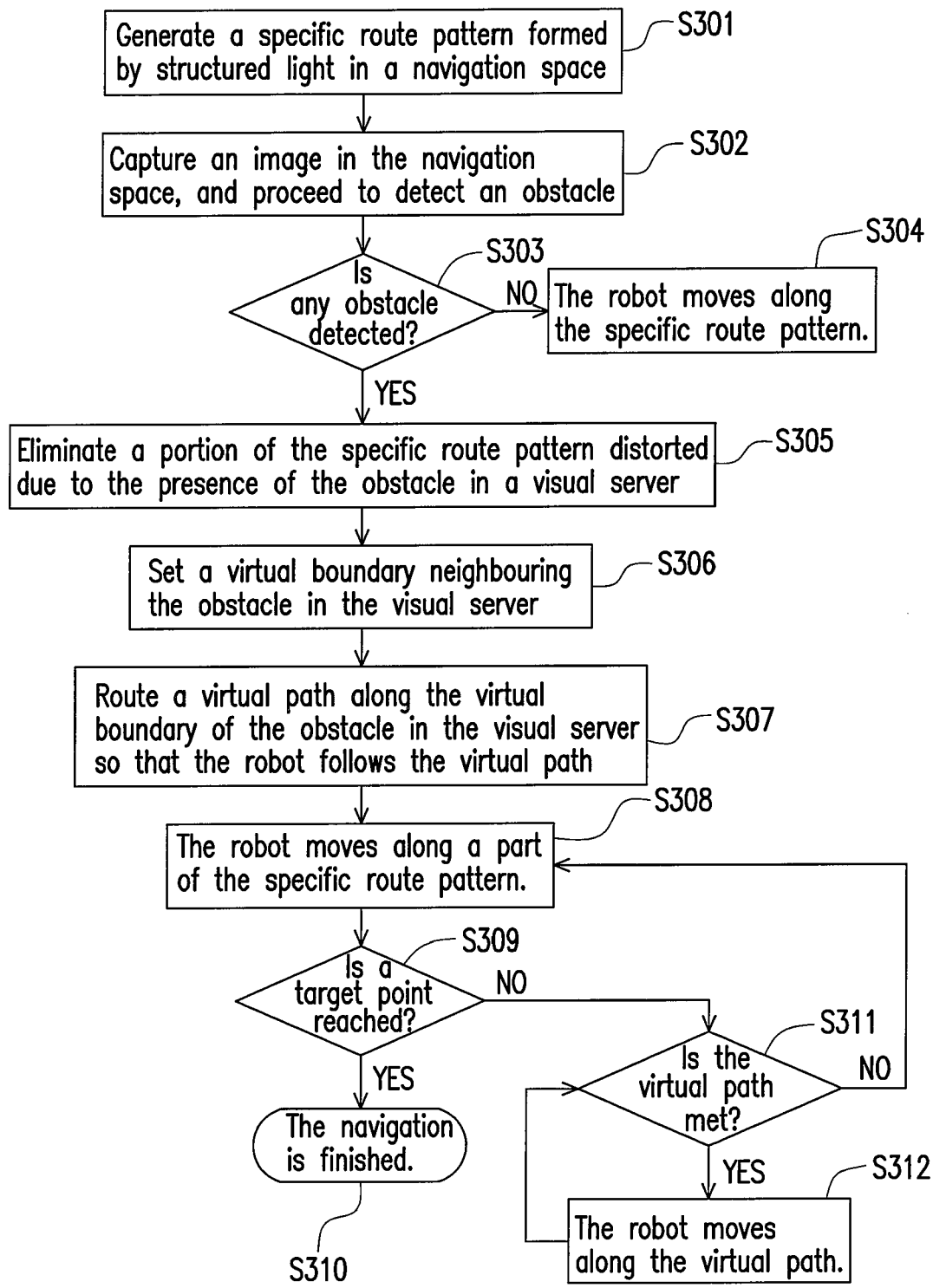
FIG. 3 is a flow chart of a visual navigation method based on structured light according to an embodiment of the present invention.

FIG. 3 is a flow chart of a visual navigation method for the above visual navigation system based on structured light according to the present invention. First, in Step S301, the specific path pattern 5 formed by the structured light is generated in the navigation space 6 through the projection of the projector 2. Next, in Step S302, the image capture device 1 captures an image of the navigation space and then transmits the image to the visual server 3, so as to detect an obstacle by comparing the captured pattern image with a predetermined pattern in the visual server 3. If it is found that the specific path pattern in the captured image is distorted, an obstacle is detected according to Step S303. On the contrary, if it is found that the specific path pattern in the captured pattern image is not distorted, no obstacle is detected (i.e., Step S304), and thus the robot 4 moves forward along the specific path pattern 5. Once the visual server 3 detects the obstacle, in Step S305, the distorted portion of the specific path pattern 5 due to the obstacle is eliminated and a virtual boundary neighbouring the obstacle is set at the periphery of the eliminated line, as shown in Step S306. At this time, the visual server 3 further routes the virtual path 5z for the robot 4 to follow (Step S307). The distance between the virtual path 5z and the virtual boundary neighbouring the obstacle is at least the same as that from the heart of the robot to its outermost shell, or determined by the distance between several particular marks (such as stickers with different colours or shapes or LED indicators) attached on the robot, or obtained by other algorithms for routing a path, so as to prevent the robot 4 from bumping into the obstacle 7. Then, as shown in Step S308, the robot 4 moves forward along the specific path pattern 5. Afterwards, in Step S309, it is determined whether a target point is reached, if yes, the navigation is finished (i.e., Step S310); if not, it is further determined whether the previously routed virtual path is met (i.e., Step S311). If the virtual path is met, the robot follows the virtual path (i.e., Step S312); if not, the robot continues moving along the specific path pattern 5 (i.e., Step S308), and Steps S309 and S310 are performed repeatedly till the robot 4 reaches the target point.

Figure 4:
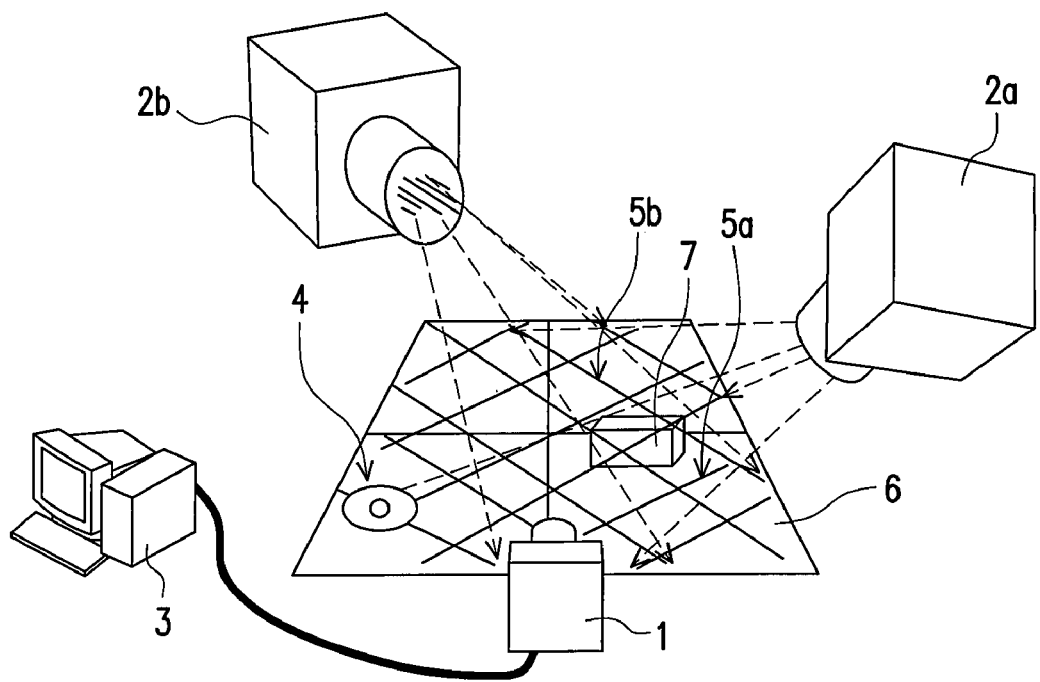
FIG. 4 is a visual navigation system based on structured light according to a second embodiment of the present invention

FIG. 4 shows a second embodiment of the present invention. The visual navigation system based on structured light includes an image capture device 1, a projector 2a and another projector 2b, a visual server 3, and a robot 4. The projector 2a is constructed opposite to the projector 2b. The projectors 2a, 2b respectively project specific path patterns 5a, 5b overlapped with each other into the navigation space 6 where the robot 4 requires a navigation path. The specific path patterns 5a, 5b together form a combined path pattern large enough for covering the navigation space around the obstacle 7, such that the obstacle 7 does not block the projection of the structured light due to its own volume to result in a region without the combined path pattern nearby. In order to enable the robot 4 to identify that the path it follows is the path pattern 5a or 5b, each of the specific path patterns 5a, 5b has structured light of a different colour, for example, red or blue, such that the robot 4 moves along a path pattern of a particular colour with the assistant of an optical sensor.

The image capture device 1 captures an image in the navigation space and then transmits the image to the visual server 3 to be processed. The visual server 3 identifies the position of the robot 4 in the image, confirms the position of the obstacle 7 from the distorted portion of the specific path pattern 5 projected into the navigation space, and then once again routes a path neighbouring the obstacle 7 to serve as a virtual path 5z. Upon receiving a signal sent by the visual server 3, the robot 4 starts moving along the specific path pattern 5 and carries out tasks (such as cleaning) at the same time. Meanwhile, the image capture device 1 still keeps capturing images. As seen from FIG. 2, when the robot 4 moves along the specific path pattern 5 to reach a place neighbouring the obstacle 7, the visual server 3 issues a navigation instruction to the robot 4, such that the robot 4 adjusts its moving direction and speed accordingly and follows the virtual path 5z routed through the previous operations. After the robot's moving along virtual path 5z is finished, the robot 4 continues moving along the specific path pattern 5 actually projected into the space.

Figure 5:
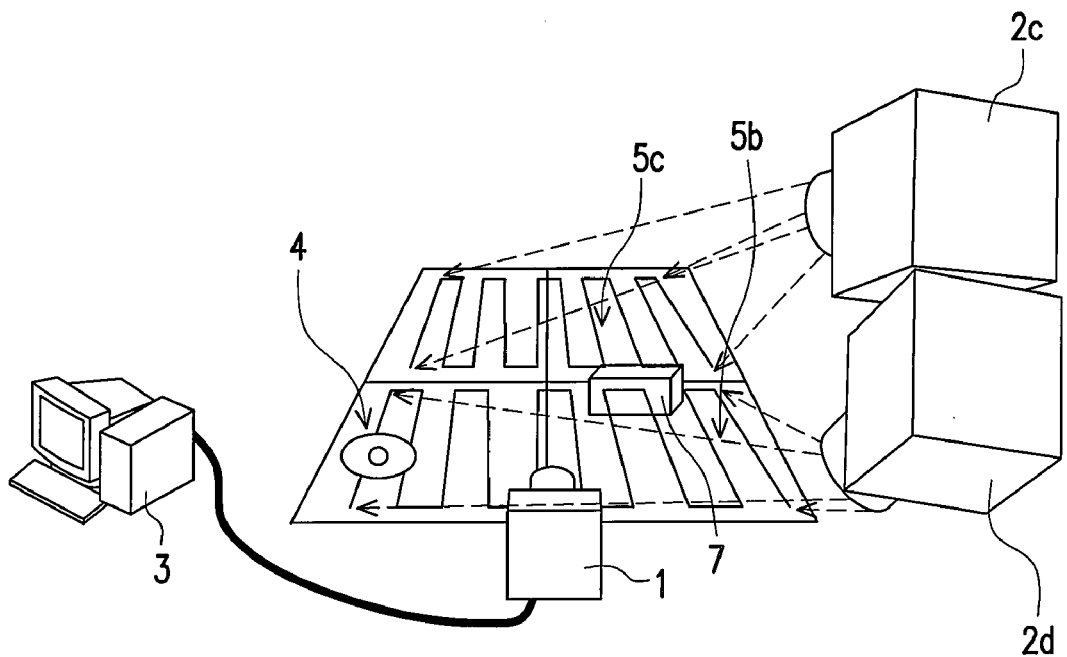
FIG. 5 is a visual navigation system based on structured light according to a third embodiment of the present invention

FIG. 5 shows a third embodiment of the present invention. The visual navigation system based on structured light includes an image capture device 1, a projector 2c and another projector 2d, a visual server 3, and a robot 4. The projectors 2c and 2d may be independent devices or they may be connected to each other via a mechanism. The two projectors 2c and 2d respectively project specific path patterns 5c, 5d into a navigation space 6 where the robot 4 requires a navigation path. The image capture device 1 captures an image in the navigation space and then transmits the image to the visual server 3 to be processed. It is clearly seen from FIG. 5 that, the regions in the navigation space 6 where the projectors 2c, 2d intend to project thereon are not overlapped with each other, so the specific path patterns 5c, 5d are not overlapped with each other as well. If the specific path patterns are not overlapped with each other, the projectors respectively project towards the same region in the navigation space at different time or project towards different separated regions in the navigation space at the same time. Therefore, the robot 4 is capable of identifying the path it follows is the path pattern 5a or 5b. In other words, the structured light for forming the specific path patterns 5c, 5d does not have to be different in colour. The visual server 3 identifies the position of the robot 4 in the image, confirms the position of the obstacle 7 from the distortion of the specific path patterns 5c, 5d projected into the navigation space, and then once again routes a path neighbouring the obstacle 7 to serve as a virtual path 5z (as shown in FIG. 2). Upon receiving a signal sent by the visual server 3, the robot 4 starts moving along the specific path pattern 5 and carries out tasks (such as cleaning) at the same time. Meanwhile, the image capture device 1 still keeps capturing images. As seen from FIG. 2, when the robot 4 moves along the specific path pattern 5 to reach a place neighbouring the obstacle 7, the visual server 3 issues a navigation instruction to the robot 4, such that the robot 4 adjusts its moving direction and speed accordingly and follows the virtual path 5z routed through the previous operations. After the robot's moving along virtual path 5z is finished, the robot 4 continues advancing along the specific path pattern 5 actually projected into the navigation space.

Figure 6:
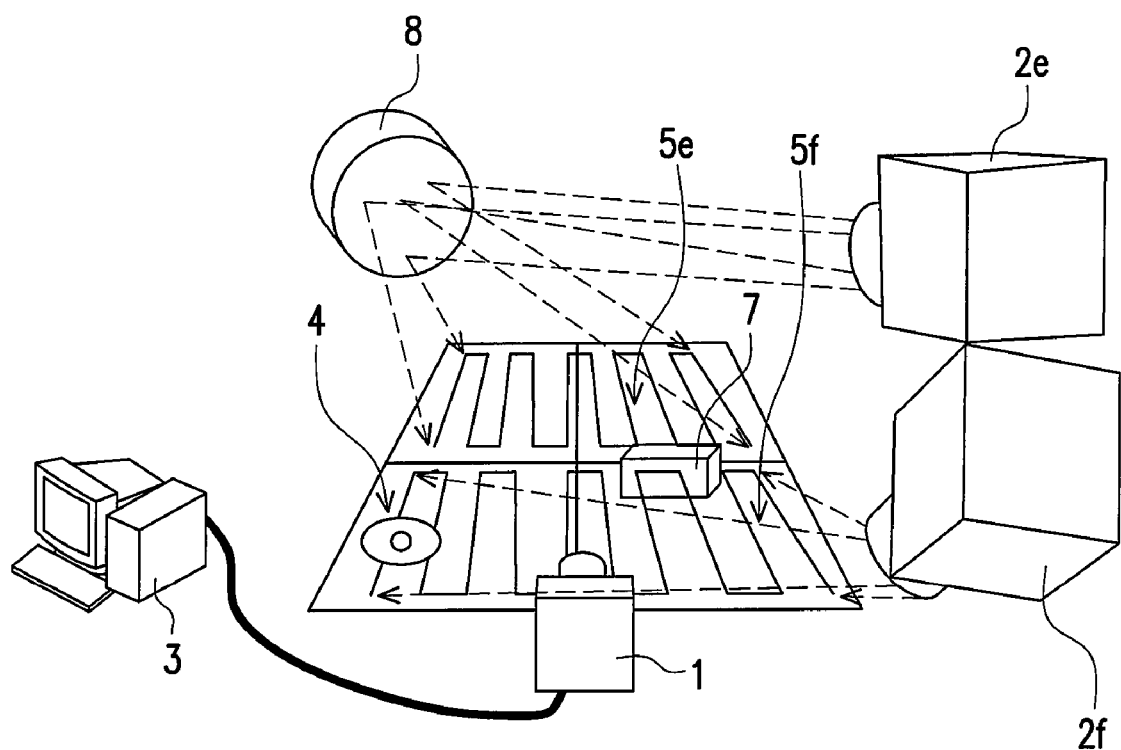
FIG. 6 is a visual navigation system based on structured light according to a fourth embodiment of the present invention

FIG. 6 shows a fourth embodiment of the present invention. The visual navigation system based on structured light includes an image capture device 1, projectors 2e and 2f, a visual server 3, and a robot 4. The two projectors 2e and 2f may be independent devices or they may be connected to each other via a mechanism. A reflector 8 is further installed for reflecting a specific path pattern 5e projected by the projector 2e into the navigation space 6 where the robot 4 requires a navigation path. The other projector 2f directly projects a specific path pattern 5f into the navigation space 6 or can project a specific path pattern by using an additional reflector. In addition, similar to the third embodiment, the specific path patterns 5e, 5f are not overlapped with each other, and thus the robot 4 is capable of identifying the path it follows is the path pattern 5e or 5f. Therefore, the structured light for forming the specific path patterns 5e, 5f does not have to be different in colour.

Then, the image capture device 1 captures an image in the space and then transmits the image to the visual server 3 to be processed. The visual server 3 identifies the position of the robot 4 in the image, confirms the position of an obstacle 7 from the distortion of the specific path patterns 5e, 5f projected into the space, and then once again routes a path neighbouring the obstacle 7 to serve as a virtual path 5z. Upon receiving a signal sent by the visual server 3, the robot 4 starts moving along the specific path pattern 5 and carries out tasks (such as cleaning) at the same time. Meanwhile, the image capture device 1 still keeps capturing images. As seen from FIG. 2, when the robot 4 moves along the specific path pattern 5 to reach a place neighbouring the obstacle 7, the visual server 3 issues a navigation instruction to the robot 4, such that the robot 4 adjusts its moving direction and speed accordingly and follows the virtual path 5z routed through the previous operations. After the robot's moving along virtual path 5z is finished, the robot 4 continues moving along the specific path pattern 5 actually projected into the space.

In view of the above, compared with the prior art, the present invention has the following advantages.

1. The present invention is capable of working under darkness, and thus overcoming the problem that a malfunction of an ordinary visual servo easily occurs in an environment of low illumination.

2. The structured light offers both the position of the obstacle and a navigating path. The navigating path combined with a part of an intelligently-routed path lowers the ratio of the operations required by the visual server, thereby solving the most serious operation instantaneity problem for the visual server.

3. Compared with the manner that all the paths adopt the visual server, the present invention improves the tracking precision of the robot, especially at far-away places in the image.

4. The problem that the wandering paths for the autonomously moving robots are repeated and time consuming and power consuming can be solved in the present invention.

5. The present invention can be combined with an existing computer or image monitoring system, so no additional system is required to be constructed.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A visual navigation system based on structured light, comprising:
   a projector constructed in an environment and external to the robot for projecting the structured light into a navigation space from outside the navigation space to form a specific path pattern;
   an image capture device, constructed in the environment, for capturing an image in the navigation space, wherein the image capture device is not located in the navigation space;
   a robot, moving along the specific path pattern; and
   a visual server, for receiving the image in the navigation space transmitted by the image capture device, so as to identify the position of the robot in the image, confirming a position of an obstacle from a distorted portion of the specific path pattern in the image, and routing a virtual path beginning and ending at the specific path and neighbouring the obstacle;
   wherein when the robot moves along the specific path pattern and reaches a place neighbouring the obstacle, the visual server issues a navigation instruction to the robot to make the robot follow the virtual path, and after the robot's moving along the virtual path is finished, the visual server issues a navigation instruction to the robot to make the robot continue moving along the specific path pattern.

2. The visual navigation system based on structured light according to claim 1, wherein the image capture device and the projector are disposed on the same side or on the opposite sides of the navigation space in the environment.

3. The visual navigation system based on structured light according to claim 1, wherein the number of the projector is more than one, and the projectors are constructed on the same side or on the opposite sides of the navigation space in the environment.

4. The visual navigation system based on structured light according to claim 3, wherein a reflector is further installed in the environment, for reflecting the structured light projected by one of the projectors into the navigation space, such that the reflected light together with specific path patterns respectively projected by the other projectors forms a complete path pattern large enough for covering the navigation space.

5. The visual navigation system based on structured light according to claim 4, wherein the number of the reflector is more than one.

6. The visual navigation system based on structured light according to claim 3, wherein as the specific path patterns respectively projected from the projectors together form a combined path pattern large enough for covering the navigation space around the obstacle, the obstacle does not block all the projection of the structured light due to the volume thereof to result in a region without the combined path pattern nearby.

7. The visual navigation system based on structured light according to claim 1, wherein the robot senses the specific path pattern through an optical sensor or an image sensor, and thus the robot moves along the specific path pattern.

8. A visual navigation method based on structured light, comprising:
   generating a specific path pattern foamed by structured light in a navigation space through a projection of a projector wherein a target point is on the specific path pattern;
   capturing an image in the navigation space by an image capture device, wherein the image capture device is constructed in the environment and not located in the navigation space;
   detecting an obstacle according to a distorted portion of the specific path pattern in the image, wherein if no obstacle exists, a robot moves along the specific path pattern in the navigation space; if an obstacle exists, a portion of the specific path pattern in the image distorted due to the obstacle is eliminated and a virtual boundary neighbouring the obstacle is set, and a virtual path beginning and ending at the specific path is routed, wherein when the robot moves along the specific path pattern and reaches a place neighbouring the obstacle, a navigation instruction is issued to the robot to make the robot follow the virtual path, and after the robot's moving along the virtual path is finished, another navigation instruction is issued to the robot to make the robot continue moving along the specific path pattern;
   determining whether said target point is reached, if yes, the navigation is finished; if not, it is determined whether the robot follows the virtual path;
   wherein if yes, the robot follows the virtual path; if not, the robot continues moving along the specific path pattern, and the above step of determining is performed repeatedly till the robot reaches the target point.

9. The method according to claim 8, wherein the projection and capturing of the image are performed on the same side or on the opposite sides of the navigation space in the environment.

10. The method according to claim 8, wherein the structured light comes from an optical projector or any other optical projection devices.

11. The method according to claim 8, wherein the detection of an obstacle, the routing of a path, or other operations is performed by a computer or any other embedded operating devices.

12. The method according to claim 8, wherein the robot senses the specific path pattern through an optical sensor or an image sensor, and thus the robot moves along the specific path pattern.

13. The method according to claim 8, wherein a distance between the virtual path and the virtual boundary of the obstacle is at least the same as that from a heart of the robot to an outermost shell thereof, or determined by a distance between several marks attached on the robot, or obtained by other algorithms for routing a path.

14. A visual navigation method based on structured light, comprising:
- generating a plurality of specific path patterns formed by structured light in a navigation space through projection of a plurality of projectors, wherein the specific path patterns are overlapped or are not overlapped with each other, and if the specific path patterns are overlapped with each other, each specific path pattern has a different color; wherein a target point is on the specific path pattern;
- capturing a pattern image in the navigation space by an image capture device, wherein the image capture device is constructed in the environment and not located in the navigation space;
- detecting an obstacle according to a distorted portion of the specific path patterns in the image, wherein if no obstacle exists, a robot moves along the specific path patterns in the navigation space; if an obstacle exists, a portion of the specific path patterns in the image distorted due to the obstacle is eliminated and a virtual boundary neighbouring the obstacle is set, and a virtual path beginning and ending at the specific path is routed, wherein when the robot moves along the specific path pattern and reaches a place neighbouring the obstacle, a navigation instruction is issued to the robot to make the robot follow the virtual path, and after the robot's moving along the virtual path is finished, another navigation instruction is issued to the robot to make the robot continue moving along the specific path pattern;
- determining whether said target point is reached, if yes, the navigation is finished; if not, it is determined whether the robot follows the virtual path;
- wherein if yes, the robot follows the virtual path; if not, the robot continues moving along the specific path patterns, and the above step of determining is performed repeatedly till the robot reaches the target point.

15. The method according to claim 14, wherein if the specific path patterns are not overlapped with each other, the projectors respectively project towards the same region in the navigation space at different time or project towards different separated regions in the navigation space at the same time.

16. The method according to claim 15, wherein as different separated regions in the navigation space form a combined path pattern large enough for covering the navigation space around the obstacle, the obstacle does not block all the projection of the structured light due to the volume thereof to result in a region without the combined path pattern nearby.

17. The method according to claim 14, wherein the projection and capturing of the image are performed on the same side or on the opposite sides of the navigation space in the environment.

18. The method according to claim 14, wherein the projectors are constructed on the same side or on the opposite sides of the navigation space in the environment.

19. The method according to claim 18, wherein the projectors are optical projectors or any other optical projection devices.

20. The method according to claim 14, wherein a reflector is further installed in the environment, for reflecting the structured light projected by one of the projectors into the navigation space.

21. The method according to claim 20, wherein the number of the reflector is more than one.

22. The method according to claim 14, wherein the detection of the obstacle, the routing of the visual path, or other operations is performed by a computer or any other embedded operating devices.

23. The method according to claim 14, wherein the robot senses the specific path patterns through an optical sensor or an image sensor, and thus the robot moves along the specific path patterns.

24. The method according to claim 14, wherein the structured light is generated continuously, or intermittently, or only once.

25. The method according to claim 14, wherein a distance between the virtual path and the virtual boundary of the obstacle is at least the same as that from a heart of the robot to an outermost shell thereof, or determined by a distance between several marks attached on the robot, or obtained by other algorithms for routing a path.

* * * * *